Dec. 9, 1930.  J. P. BALDWIN ET AL  1,784,328
SHOCK ABSORBER
Filed Oct. 20, 1926    2 Sheets-Sheet 1
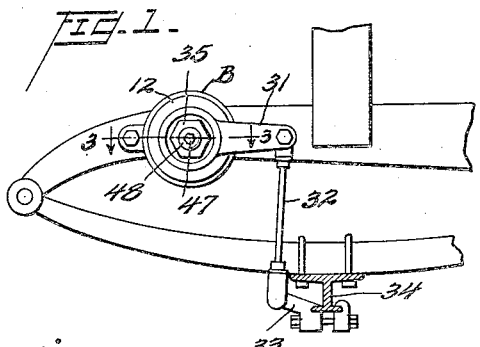
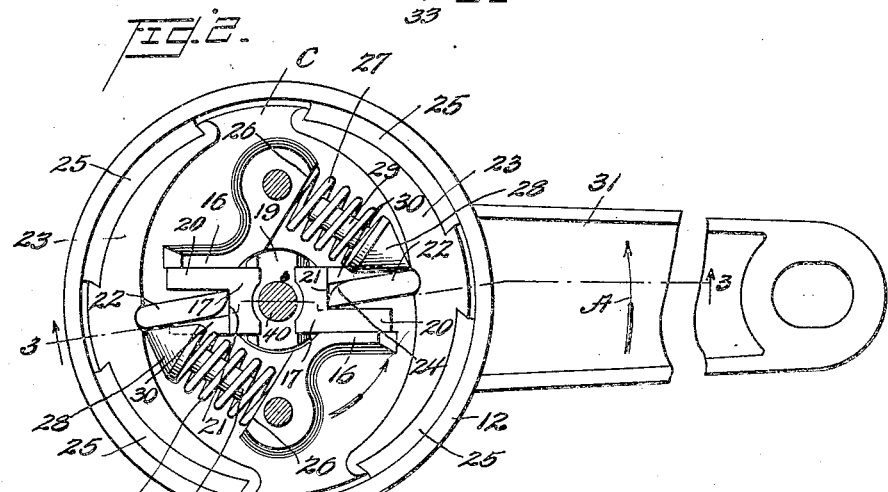
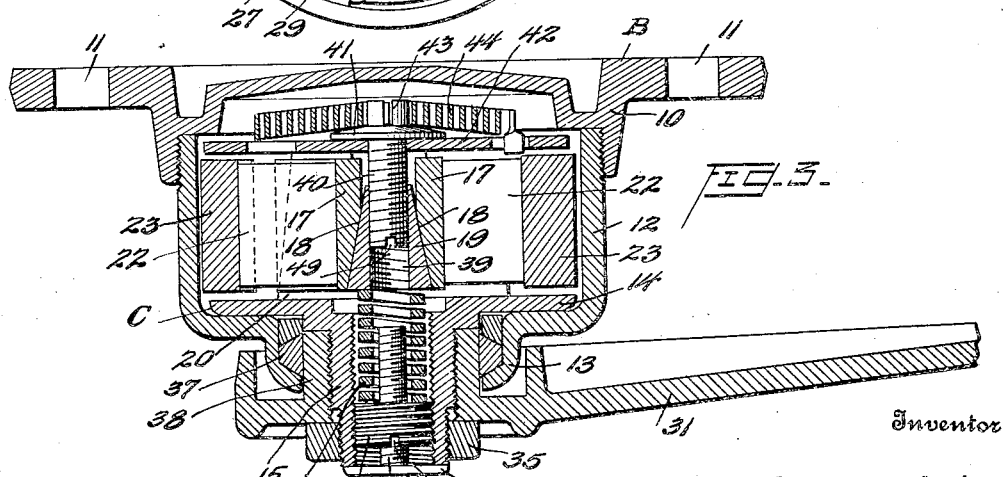
Inventor
James P. Baldwin,
Clifford Garver
By Watson, Coit, Morse & Grindle
Attorney

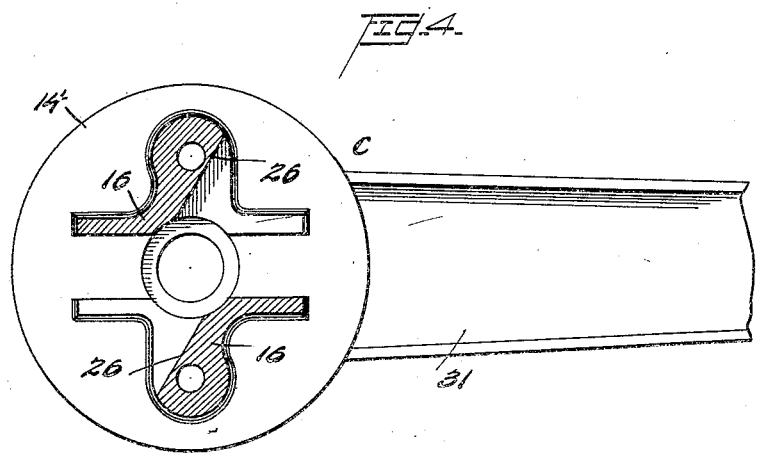
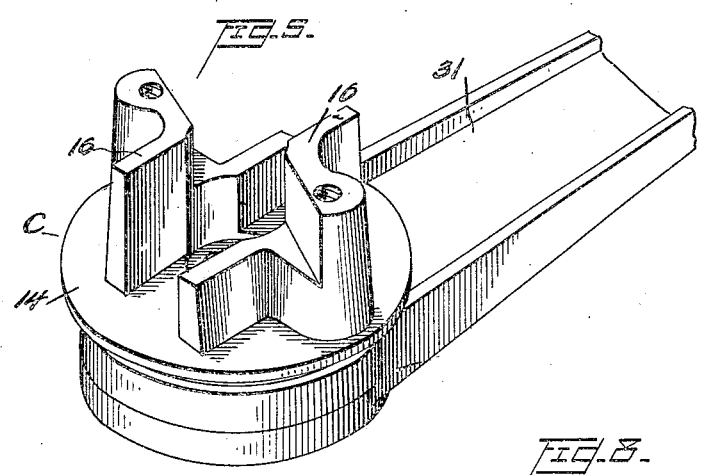
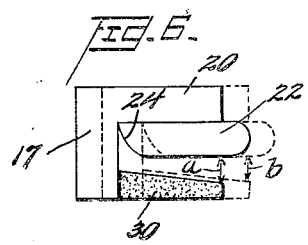
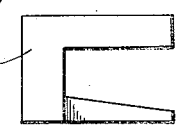
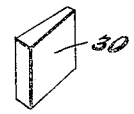

Patented Dec. 9, 1930

1,784,328

UNITED STATES PATENT OFFICE

JAMES PIERCE BALDWIN AND CLIFFORD GARVER, OF LOS ANGELES, CALIFORNIA; SAID GARVER ASSIGNOR TO SAID BALDWIN

SHOCK ABSORBER

Application filed October 20, 1926. Serial No. 142,984.

The present invention relates to shock absorbers and particularly to shock absorbers of the running friction type such, for instance, as is disclosed in the patent granted to James Pierce Baldwin December 30, 1924, No. 1,521,588.

The purpose of the invention is to provide a shock absorber which will effectually damp the oscillations of a motor vehicle body or other vibratory object, of simple construction, thus promoting ease of manufacture and assembly and lessening cost, and having a number of improved features of construction. Among these novel features is included an improved adjusting device by means of which the "pull" or resistance to oscillation offered by the shock absorber to movements of the body with which it is associated may be regulated. This adjusting device also effects the automatic adjustment of the operating parts from time to time to take up any looseness which may occur due to wear. A number of other novel features will be apparent to those skilled in the art from the disclosure of the invention in the following detailed description and in the accompanying drawings, in which one embodiment thereof is illustrated by way of example. For instance, a friction producing mechanism is disclosed which embodies two friction shoes instead of three, as in Patent No. 1,521,588, referred to, together with means for causing them to bear with equal pressures on the cooperating friction surfaces for all adjustments of the absorber.

In the drawings:

Figure 1 is a side elevation of portion of the front end of a motor vehicle chassis showing the manner of application of the shock absorber thereto;

Figure 2 is a plan view of the shock absorber with portion of the casing removed to show the operating parts;

Figure 3 is a section on line 3—3 of Fig. 1;

Figure 4 is a plan view of the core of the absorber, one of its principal operating parts;

Figure 5 is a perspective view of the same; and

Figures 6, 7 and 8 are details.

The shock absorber disclosed in Patent No. 1,521,588, previously referred to, is of the friction shoe type, there being three friction shoes and means for thrusting these shoes outwardly against an annular friction surface upon the occurrence of relative movement of the two principal operating parts in one direction and releasing these shoes upon the occurrence of such relative movement in the opposite direction. That shock absorber is therefore, as is the present one, of the "one way" type. We have found it possible, by modifying the structure disclosed in the prior patent in certain particulars, to obtain a satisfactory running friction shock absorber which embodies two friction shoes instead of three, and the present invention contemplates the use of two shoes together with mechanism which insures equalization of bearing pressures of the two shoes upon the cylindrical friction surface at all times during the operation of the absorber.

The principal parts of the absorber are the base B and the core C, these parts being coaxial and the base enclosing the core, as can be seen from Fig. 3. The base comprises essentially a plate 10 provided with apertures 11 to permit the insertion of bolts therethrough by means of which it may be securely fastened to a support such as the side frame member of a motor vehicle chassis, and a shell 12 the major portion of which is substantially cylindrical but which has a necked down outer end 13. The inner end of the shell is threaded to an annular flange integral with and projecting from one face of plate 10. The cylindrical inner face of shell 12 constitutes a cylindrical friction surface.

The core C comprises a disk 14 having a hollow axial spindle or tubular portion 15 projecting from one face thereof and extending through and beyond the necked down portion 13 of the shell, and lugs or pedestals 16 projecting from the opposite face of the disc as can be most clearly seen in Figs. 4 and 5. These lugs or pedestals are similar in form and their inner faces are in parallel relationship and disposed at right angles to the surface of the disc 14. The channel defined by the inner faces of the lugs and the upper surface of the disc constitutes a guide channel for the two aligned sliding abutments 17, these abutments being equidistantly spaced from the axis of the core and their inner ends respectively being inclined, as at 18, (Fig. 3), to bear against the correspondingly inclined faces of an adjusting wedge member 19.

The abutments 17 are L-shaped, as shown in Fig. 2, having extensions 20 and the outer faces 21 of these abutments, at the inner ends of the extensions, constitute bearing faces. Against these bearing faces rest the inner ends of non-resilient moving struts 22, 22, the outer ends of these struts being in contact respectively with the inner faces of curved friction shoes 23, 23 which engage the inner cylindrical friction face of the shell. Preferably the outer ends of the struts are cylindrical and engage correspondingly formed recesses formed in the inner faces of the friction shoes. We also prefer to form the inner ends of the struts with involute faces 24 as set forth in Patent 1,521,588. The friction shoes are provided with spaced friction leathers 25, 25.

One side or wing of each pedestal is cut away to provide an abutment face 26 and resting against each such face is one end of a coiled expansion spring 27. The other end of each such spring acts against the rear face of a plunger-like member 28 having a pointed forward end lying in the angle between the corresponding moving strut 22 and friction shoe 23 and bearing against both of these members. Springs 27 continuously urge the plunger members 28 away from the abutment faces 26 and tend to constantly maintain the friction shoes in engagement with the cylindrical friction face. To prevent side collapse or deformation of the coil springs the plunger members are provided with stems 29 which extend axially through the springs but which terminate short of the abutment faces 26.

Beneath the plunger members 28 but confined in the guideways for the abutment 17 are outwardly tapered stops 30 of hard fiber, leather or similar material, which serve to limit the movements of the struts as they move in the direction which results in release of the friction shoes from the cylindrical friction surface of the base. These wedge-like members 30 may be of any desired material and may even be formed integral with the abutments, as shown in Fig. 7, but we preferably form them separately from the abutments which are of metal, to save expense in machining and decrease the liability of breakage and also for the reason that they may be made of sound deadening material so that no metallic noise may be heard when the moving struts suddenly reach their positions of maximum release.

Threaded upon the hollow spindle 15 is the operating arm 31 the outer end of which is connected by a link 32 to a bracket 33 secured upon the axle 34 of the vehicle. Also threaded upon the extreme outer end of this spindle is a lock nut 35 the threads of which are of the opposite "hand" from the interengaging threads of the arm 31 and spindle 15, this lock nut being provided to prevent backing off of the arm from the core in the ordinary operation of the shock absorber. A suitable packing ring 37 fills the space between the necked down outer end of the shell 12 and the interiorly threaded sleeve 38 of arm 31 and prevents the entrance of dust within the casing as well as the escape of lubricant.

The wedge block 19 previously referred to has an axially threaded bore 39 and extending into this bore and having threaded relation therewith is an adjusting screw 40 by means of which the wedge block may be moved upwardly (Fig. 3) from time to time to thrust the abutments 17, 17 outwardly to take up looseness of the parts due to wear. The upper end of the adjusting screw 40 is provided with an enlarged head 41 with a flat lower face which rests upon a circular plate 42 fastened to the upper ends of pedestals 16. The upper end of the adjusting screw 40 is slotted as at 43 and extending into this slot is the inner end of a spiral spring 44, hereinafter designated a secondary spring, the coils of which are disposed about the adjusting screw and the outer end of which extends through an aperture in the stationary plate 42. This spring constantly tends to rotate the adjusting screw in such direction as to draw the adjusting block 19 upwardly and thrust the abutments outwardly, but the spring is of such strength, and the pitch of the thread of screw 40 and the angles of inclination of the inclined faces of the wedge block 19 are such, that this can only be done when the friction between the screw head 41 and the stationary plate 42 is decreased due to the upward thrust of an additional booster spring, hereinafter designated a primary spring, which is indicated at 45. This primary spring is helical, its upper end bears upon the bottom of the bottom of the wedge block 19 as seen in Fig. 3, and its lower end bears upon a cylindrical abutment block 46 which has threaded engagement with the interiorly threaded wall of spindle 15.

The primary spring tends to thrust block 19 upwardly at all times and therefore to thrust the abutments 17 outwardly to take up any looseness existing between the moving struts and the abutments and friction shoes. When looseness occurs, as before explained, and the block 19 is moved upwardly, the head of screw 41 is lifted slightly from plate 42 or, at least, lifted to such an extent that spring 44 can overcome the friction between the screw head and the plate, the screw 40 being rotated and the block 19 adjusted to its new position.

The adjusting block 46 is also provided with a central threaded bore through which the exteriorly threaded bolt 47 extends. This bolt serves to retain in place a cap 48 which closes the outer end of spindle 15. The lower or inner end of screw 40 is slotted at 49 and the lower end of threaded abutment block 46 is slotted at 50, these slots being provided for the reception of an adjusting tool such as a screw driver. By removing the cap 48 the adjusting block 46 becomes accessible so that the tension of spring 45 may be increased or decreased by rotating this block. Likewise by the removal of the cap 48 and block 46 a tool may be inserted in the slot 49 so that the adjusting bolt 40 may be rotated and the block 19 raised or lowered. It will be understood that the plate 10 of the base may be secured to a horizontal, vertical or inclined surface and that the terms "raised" and "lowered" are not words of limitation, being chosen for convenience only in describing the movements of the parts. The absorber will function in any position.

In the ordinary operation of the shock absorber, engagement of the friction shoes with the cylindrical friction surface is brought about by rotation of the arm 31 in the direction of the arrow A shown in Fig. 2. The core C, of course, rotates with the arm 31 and the friction shoes are thrust outwardly by the moving struts 22 to engage the shell or base. Movement of the arm and core in the opposite direction results in rocking movement of the moving struts toward released position, in which position they are shown in Fig. 2, this movement continuing until the struts contact with the stops 30. In the friction producing direction the struts 22 may move into contact with the extensions 20 of the abutments or such movement may terminate short of contact with these extensions due to the curvature of the inner ends of the struts in the manner fully set forth in Patent No. 1,521,588, previously referred to. At all events it will be seen that inasmuch as the adjusting block 19 is unconfined laterally the struts, abutments and adjusting block comprise a floating system insuring equal thrust of the struts 22 and equal frictional engagements of the two shoes.

The primary spring 45 should exert just the proper force to take up the wear in the shock absorber and to keep the operating parts fitting snugly. If this spring exerts too great a force the adjustment of the block 19 will be such that the shoes may offer too great a resistance, that is, the shock absorber may be caused to work too heavily. If this occurs the abutment block 46 should be moved outwardly a short distance or a lighter spring inserted. In making this adjustment it may be desirable to lower the wedge block 19 somewhat since this block cannot be lowered merely by adjusting the tension of spring 45. This is effected by rotation of adjusting bolt 40 by means of a tool inserted in slot 49. It will be apparent that the rocking or oscillating movements of the moving struts 22 in the release direction are limited, for all positions of the abutment 17, to a definite angle of inclination since both the projections 20 and the stops 30 travel outwardly as the abutments travel outwardly and the distance "b" (Fig. 6) will be no greater than the distance "a". This is a necessary and important feature in a two shoe shock absorber.

While one form of shock absorber in which the novel features which we have invented are embodied is disclosed it will be apparent to those skilled in the art that the design and arrangement of the component elements of our invention may be varied widely without departure therefrom. Particularly the automatic adjusting mechanism including the primary and secondary springs, adjusting bolt and adjusting block may be modified to suit conditions. This adjusting system is, furthermore, well adapted to be employed in connection with the shock absorber employing three or more shoes and is not limited to use with a two shoe construction. Likewise, other features of invention may be embodied in shock absorbers which vary widely in appearance and function.

Having thus described the invention, what is claimed as new and desired to be secured by Letters Patent is:

1. A shock absorber of the moving strut friction shoe type and having abutments for the struts which may be adjusted relatively to each other, of an abutment adjusting device comprising a wedge member having inclined faces contacting with the abutments respectively, a primary spring acting directly on said wedge and a secondary spring acting on the wedge through the intermediary of a screw bolt which has threaded relation with the wedge member.

2. A shock absorber of the friction shoe moving strut type and having abutments for the struts which may be adjusted relatively to each other, of an automatic abutment adjusting device which includes resilient means normally tending to effect adjustment of said device, and means for automatically locking the adjusting device in adjusted position.

3. The combination set forth in claim 2 in which said last mentioned means includes a rotatable threaded member, a spring constantly tending to rotate the same, and a friction element normally holding the said member against rotation.

4. For use in combination with a shock absorber of the friction shoe type, a wedge member, a primary spring urging the wedge in a rectilinear path, a secondary spring, and means controlled by the secondary spring for locking the wedge in adjusted position.

5. In a shock absorber, in combination, relatively rotatable members, one having an internal cylindrical friction face and the second carrying friction shoes, rocking struts, and adjustable strut seats together with a device for automatically adjusting said seats outwardly to compensate for wear, said device including a wedge member in engagement with all of said seats and movable axially of said relatively rotatable members, means constantly urging said wedge to move in such direction as to effect outward adjustment of the strut seats, and means for automatically positively locking the wedge against return from such adjusted position after each such movement.

6. In a shock absorber, in combination, relatively rotatable members, one having an internal cylindrical friction face and the second carrying friction shoes, rocking struts, and adjustable strut seats together with a device for automatically adjusting said seats outwardly to compensate for wear, said device including a wedge member in engagement with all of said seats and movable axially of said relatively rotatable members, a spring constantly acting on the base of the wedge and urging the same in such direction as to effect outward adjustment of the strut seats, and means for automatically and positively locking the wedge against return from such adjusted position after each such movement.

7. In a shock absorber, in combination, relatively rotatable members, one having an internal cylindrical friction face and the second carrying friction shoes, rocking struts, and adjustable strut seats together with a device for automatically adjusting said seats outwardly to compensate for wear, said device including a wedge member in engagement with all of said seats and movable axially of said relatively rotatable members, a coiled compression spring having one end seated against the base of the wedge, an adjustable abutment for the opposite end of said spring whereby it may be maintained in compression, and means for automatically and positively locking the wedge against return from such adjusted position after each such movement.

In testimony whereof we hereunto affix our signatures.

JAMES PIERCE BALDWIN.
CLIFFORD GARVER.